(12) United States Patent
Kristen

(10) Patent No.: US 10,066,717 B2
(45) Date of Patent: Sep. 4, 2018

(54) LINEAR ACTUATOR

(71) Applicant: Limoss US, LLC, Baldwyn, MS (US)

(72) Inventor: Martin Kristen, Wetter (DE)

(73) Assignee: Limoss US, LLC, Baldwyn, MS (US)

( * ) Notice: Subject to any disclaimer, the term of this patent is extended or adjusted under 35 U.S.C. 154(b) by 0 days.

(21) Appl. No.: 15/639,307

(22) Filed: Jun. 30, 2017

(65) Prior Publication Data

US 2017/0299027 A1    Oct. 19, 2017

Related U.S. Application Data

(63) Continuation of application No. 14/445,432, filed on Jul. 29, 2014, now Pat. No. 9,732,832.

(60) Provisional application No. 61/862,409, filed on Aug. 5, 2013.

(51) Int. Cl.
*F16H 25/24* (2006.01)
*F16H 25/20* (2006.01)
*A47C 1/024* (2006.01)
*A47C 20/04* (2006.01)

(52) U.S. Cl.
CPC ............ *F16H 25/24* (2013.01); *A47C 1/0242* (2013.01); *A47C 1/0246* (2013.01); *A47C 20/041* (2013.01); *A47C 20/042* (2013.01); *F16H 2025/2043* (2013.01); *F16H 2025/2481* (2013.01)

(58) Field of Classification Search
CPC .... F16H 25/24; F16H 25/20; F16H 2025/204; F16H 2025/2043; F16H 2025/248; A47C 1/0242; A47C 1/10246; A47C 20/041; A47C 20/042

USPC .............. 74/89.23; 310/12.01, 12.27, 12.33
See application file for complete search history.

(56) References Cited

U.S. PATENT DOCUMENTS

| | | |
|---|---|---|
| 1,736,878 A | 11/1929 | Duvall |
| 4,061,019 A | 12/1977 | Blasetti |
| 4,494,259 A | 1/1985 | Miller et al. |
| 4,675,926 A | 6/1987 | Lindblom et al. |
| 4,696,512 A | 9/1987 | Burnett et al. |
| 4,962,676 A | 10/1990 | Vainstock |
| 5,329,657 A | 7/1994 | Bartley et al. |
| 5,577,280 A | 11/1996 | Elliott |
| 5,746,138 A | 5/1998 | Hirose |
| 5,903,125 A | 5/1999 | Prentice et al. |
| 6,250,170 B1 | 6/2001 | Hill et al. |
| 6,402,444 B1 | 6/2002 | Wang et al. |
| 6,637,095 B2 | 10/2003 | Stumpf et al. |
| 7,237,286 B1 | 7/2007 | Kim |

(Continued)

FOREIGN PATENT DOCUMENTS

| | | |
|---|---|---|
| DE | 102013106388 B3 | 10/2014 |
| WO | 2004032684 | 4/2004 |
| WO | 2012083951 | 6/2012 |

OTHER PUBLICATIONS

U.S. Appl. No. 14/445,432, Notice of Allowance dated Mar. 24, 2017, 10 pages.

*Primary Examiner* — Burton Mullins
(74) *Attorney, Agent, or Firm* — Anthony L. Guebert; Kristin J. Doyle; Kilpatrick Townsend & Stockton LLC

(57) ABSTRACT

A linear actuator is configured to provide the moving force for adjustable furniture, such as beds, chairs, or tables. The linear actuator includes a drive assembly, rigid arm, and linkage assembly. The rigid arm includes a pusher block with one or more attachment projections where the linkage assembly is attached.

20 Claims, 8 Drawing Sheets

(56) References Cited

U.S. PATENT DOCUMENTS

| | | | |
|---|---|---|---|
| 8,316,729 B2* | 11/2012 | Schunke | F16H 25/20 |
| | | | 74/89.23 |
| 9,732,832 B2 | 8/2017 | Kristen | |
| 2006/0213298 A1* | 9/2006 | Tateishi | F16H 25/2204 |
| | | | 74/89.23 |
| 2008/0210029 A1 | 9/2008 | Wang | |
| 2009/0003129 A1 | 1/2009 | Stokkeland et al. | |
| 2009/0011894 A1 | 1/2009 | Frieb-Preis et al. | |
| 2009/0199667 A1 | 8/2009 | Menjak et al. | |
| 2009/0308187 A1 | 12/2009 | Schmid | |
| 2010/0064830 A1 | 3/2010 | Zeng | |
| 2011/0252904 A1* | 10/2011 | Sun | B23Q 1/25 |
| | | | 74/89.23 |
| 2011/0298323 A1 | 12/2011 | Brieschke | |
| 2012/0011950 A1 | 1/2012 | Kracke | |
| 2015/0033538 A1 | 2/2015 | Kristen | |
| 2015/0208805 A1 | 7/2015 | Griggs, Jr. | |

* cited by examiner

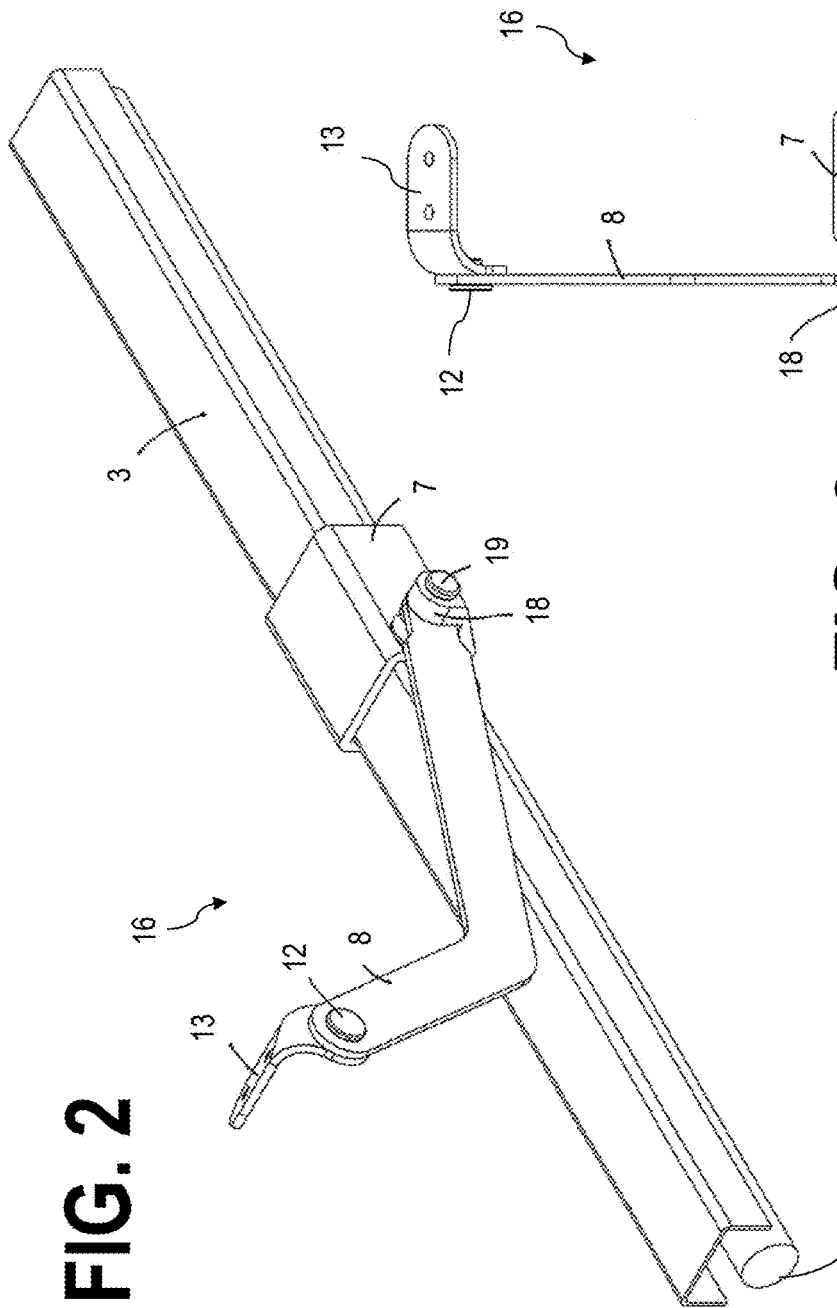
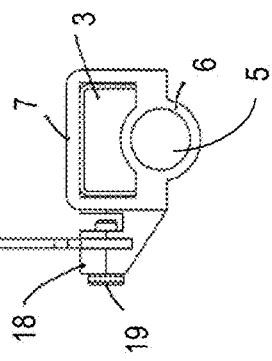

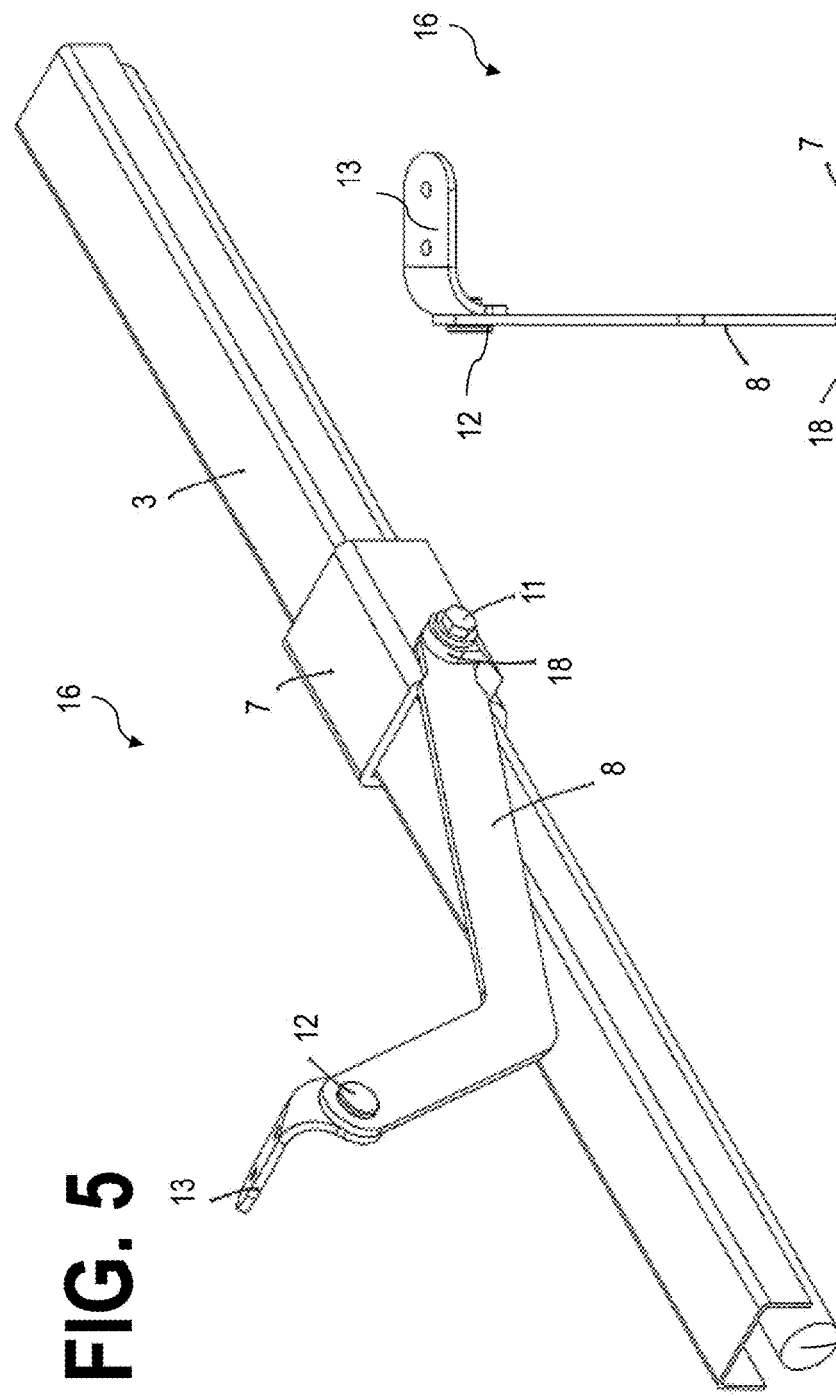
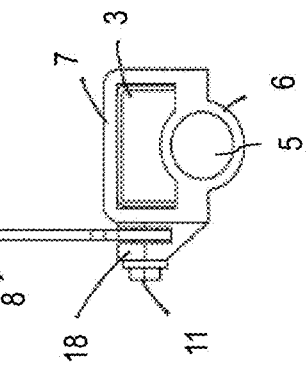

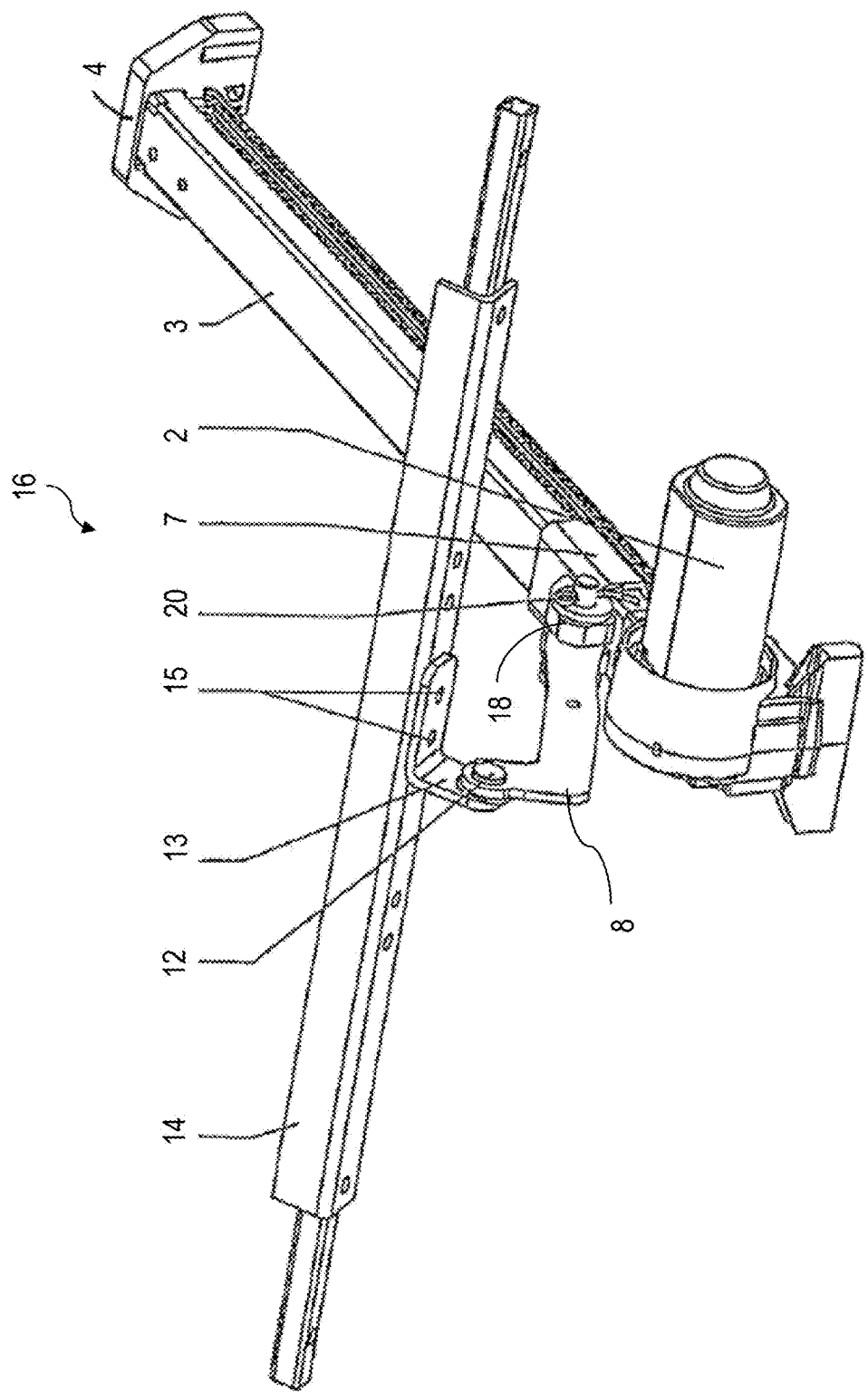

LINEAR ACTUATOR

CROSS-REFERENCE TO RELATED APPLICATIONS

This application is a continuation of U.S. patent application Ser. No. 14/445,432, filed on Jul. 29, 2014 and entitled LINEAR ACTUATOR, which claims the benefit of U.S. Provisional Application No. 61/862,409, filed Aug. 5, 2013 and entitled IMPROVED LINEAR ACTUATOR, both of which are hereby incorporated by this reference in their entireties.

FIELD OF THE INVENTION

The present disclosure reveals a new design for a linear actuator that modifies the positioning in adjustable furniture

BACKGROUND

A linear actuator is an actuator that creates motion in a straight line, in contrast to the circular motion of a conventional electric motor. Linear actuators are widely used within the area of adjustable furniture, such as beds, chairs, or tables, where they may be used for adjusting the position of adjustable furniture, such as the lifting and reclining of motion chairs, the height of a table, or the position of the mattress surface of a bed. The actuator is typically comprised of an electric motor drive assembly that drives a threaded spindle. The spindle is retained within a rigid arm, and the electric motor drive assembly is attached to the rigid arm with a plurality of threaded fasteners. A pusher block is threaded onto the spindle and is secured in linear recesses within the arm. As the electric motor drive assembly turns the spindle, the pusher block moves from one end of the arm to the other end. The direction of movement is determined by the direction of the spindle's rotation.

One end of the prior art actuators may be secured to the adjustable furniture by a rear mounting bracket. The actuators are also attached to the furniture by a pair of levers or linkages. One end of the respective linkages is secured to the pusher block with a plurality of threaded fasteners. The other end of the respective linkages communicates with the furniture. Movement of the pusher block moves the linkages and adjusts the position of the furniture.

The prior art linear actuators are costly to manufacture. Connection of the electric motor drive assembly to the rigid arm using threaded fasteners is disadvantageous because it is a time-consuming and complicated method of assembling the actuators. The prior art actuators are also difficult to mount on adjustable furniture. Use of threaded fasteners on the pusher block makes it difficult for assembly line workers to align the furniture so that the levers line up with threaded apertures in the pusher block.

Accordingly, there is a need for a linear actuator that can be quickly assembled and mounted onto adjustable furniture.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The present invention relates to an improved linear actuator. The improved linear actuator is designed to provide the moving force for adjustable furniture, such as beds, chairs, or tables. The improved linear actuator overcomes problems with the prior art by reducing the number of necessary parts and simplifying assembly to save production costs.

While the improved linear actuator is directed at use of the actuator in adjustable furniture, the improved linear actuator may be adapted for use in machine tools and industrial machinery, in computer peripherals such as disk drives and printers, in valves and dampers, and in many other places where linear motion is required.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 2 is a perspective view of an alternative embodiment of a linear actuator.

FIG. 3 is a sectional view of the linear actuator of FIG. 2.

FIG. 5 is a perspective view of an alternative embodiment of a linear actuator.

FIG. 6 is a sectional view of the linear actuator of FIG. 5.

FIG. 7 is a rear perspective view of the linear actuator of FIG. 1.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," "back," and "corners," among others are intended to refer to the orientation as illustrated and described in the figure (or figures) to which the components and directions are referencing.

Figure 1:
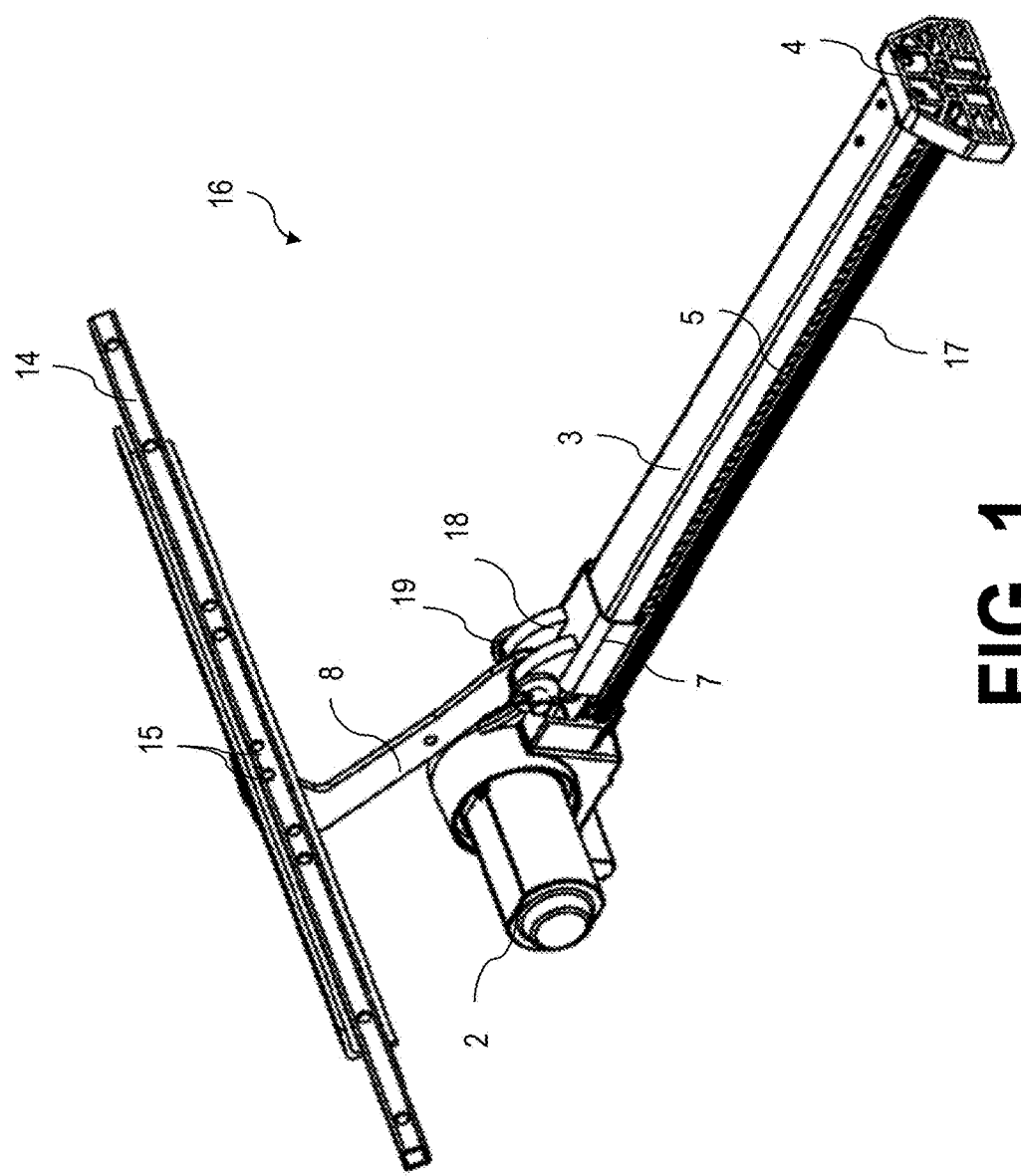
FIG. 1 is a front perspective view of one embodiment of a linear actuator.
Figure 4:
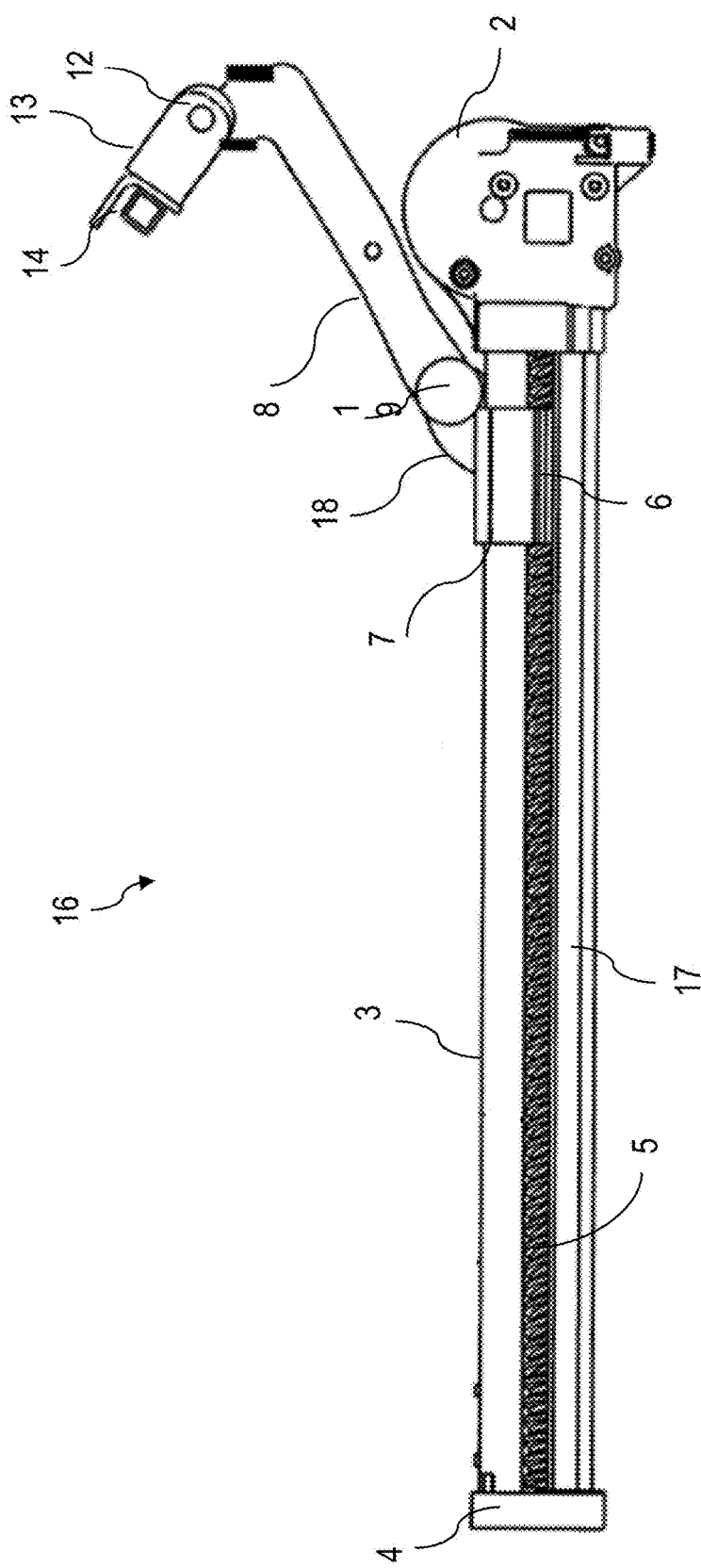
FIG. 4 is a side view of the linear actuator of FIG. 1.

FIGS. 1, 4, and 7 illustrate an embodiment of a linear actuator 16 according to the present disclosure. An electric drive motor assembly 2 is connected to a rigid arm 3. The rigid arm 3 is formed of stainless steel or other suitable material, and also includes a plastic cover 17. A threaded spindle 5 is retained inside the arm. A spindle nut 6 is threaded onto the spindle 5, and a pusher block 7 is attached to the spindle nut 6. The pusher block 7 straddles the rigid arm 3 and slides up and down the arm 3 as the electric drive motor assembly 2 turns the spindle 5. A holder 4 is attached to the other end of the rigid arm 3 to retain one end of the spindle 5 and to provide mounting points for the actuator.

The pusher block 7 provides a connection point for communicating force generated by the improved linear actuator 16 to the adjustable furniture. To simplify assembly of the actuator 16 with adjustable furniture, the top of the pusher block 7 incorporates a clevis 18. Apertures in the clevis 18 are adapted to receive a clevis pin 19 or other suitable fastener. A single linkage 8 connects the pusher block 7 to a torque tube assembly 14. An aperture at the lower end of the single linkage 8 is adapted to receive the clevis pin 19. A cotter pin 20 may be used to secure the clevis pin 19. Use of a clevis pin 19 to attach the linkage 8 and pusher block 7 eliminates the need for additional brackets and threaded fasteners to facilitate the attachment. The pin 19 also eliminates the need to mold threaded screw-receiving apertures into the pusher block 7.

The clevis 18 may also be incorporated onto one or more sides of the pusher block 7 (see FIGS. 2, 3, 5, and 6). FIG. 2 depicts an embodiment of the improved actuator 16 with the clevis 18 incorporated into the side of the pusher block 7. In this embodiment, a clevis pin 19 is used to secure the linkage 8. FIG. 3 is a cross sectional view of this embodiment. FIG. 5 depicts an embodiment of the improved actuator 16 with the clevis 18 incorporated into the side of the pusher block 7, with a threaded bolt 11 securing the linkage 8. FIG. 6 is a cross sectional view of this embodiment.

FIG. 4 is a side view of the improved actuator 16. The single linkage 8 has a unique lever shape that may be adapted to fit specific requirements for different embodiments of adjustable furniture. A single dual angle bracket 13 is moveably attached to the upper end of the linkage 8 and may be attached to a torque tube assembly 14 that transmits the force of the actuator 16 to the adjustable furniture. FIG. 7 is a rear view of the improved linear actuator 16. A bolt 12 (see FIG. 7) or similar fastener moveably secures the upper end of the single linkage 8 to the dual angle bracket 13. Threaded fasteners 15 secure the dual angle bracket to the torque tube assembly 14. The torque tube assembly 14 communicates with the adjustable furniture (not shown). A clevis pin 19 secures the lower end of the linkage 8 to the clevis 18 at the top of the pusher block 7. A cotter pin 20 secures the clevis pin 19. The improved linear actuator 16 simplifies the process of attaching the actuator 16 to the furniture because the clevis 18 makes it easier for assembly workers to align the furniture, torque tube assembly 14, linkage 8, and pusher block 7. Additionally, assembly can be simplified through use of a single linkage 8.

Figure 8:
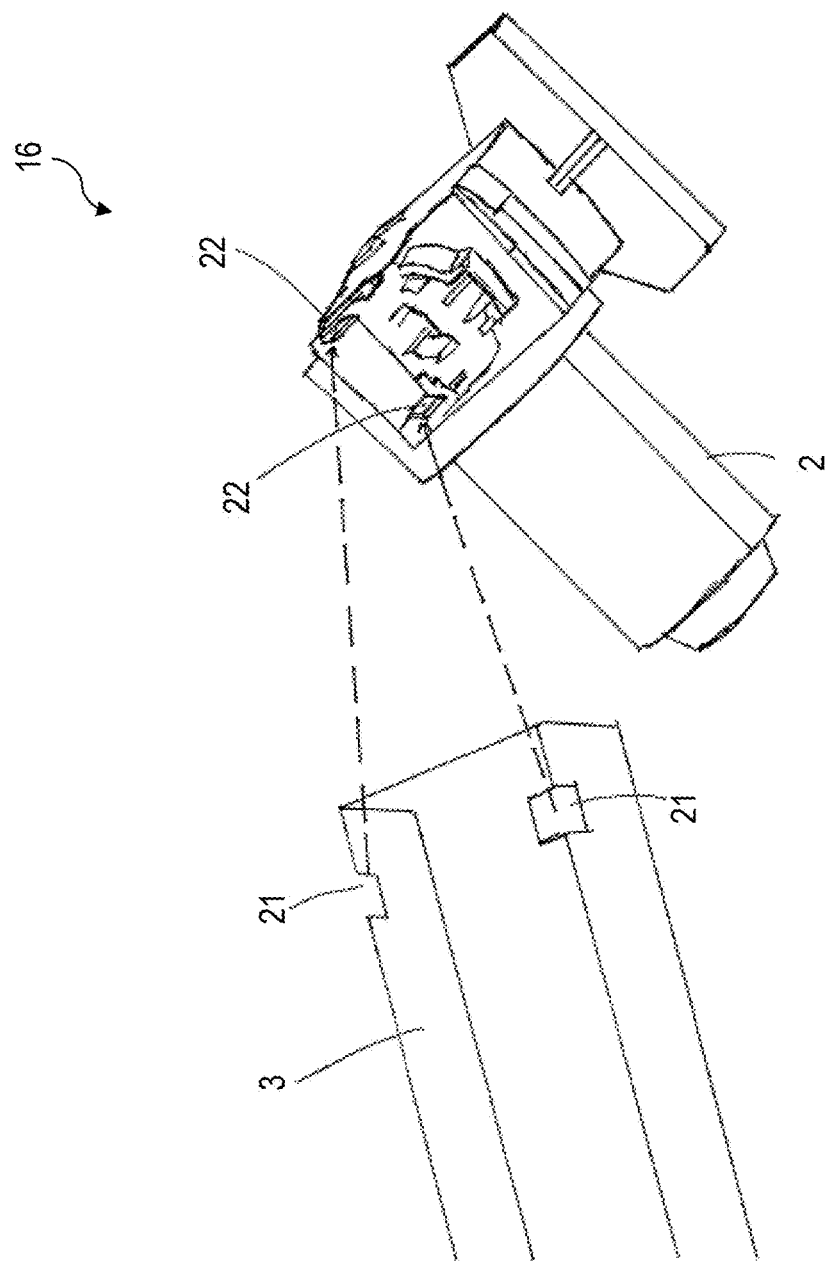
FIG. 8 is an enlarged view of the dis-assembled rigid arm and drive motor of the linear actuator of FIG. 1.

The improved linear actuator 16 contains other improvements that reduce time to assemble the actuator 16. FIG. 8 is a close up view of a disassembled electric drive motor assembly 2 and rigid arm 3. The end of the rigid arm 3 contains one or more slots 21. The slots 21 are adapted to receive one or more prongs 22 molded into the base of the drive motor assembly 2. The slots 21 and prongs 22 allow the drive motor assembly 2 to be pressed onto the rigid arm 3 when the improved linear actuator 16 is assembled. The prongs 22 apply pressure to the arm 3 to securely hold the drive assembly 2 and rigid arm 3 together. Use of the slots 21 and prongs 22 eliminates the use of threaded fasteners to secure the drive assembly 2 and arm 3 together, decreasing manufacturing time.

Figure 9:
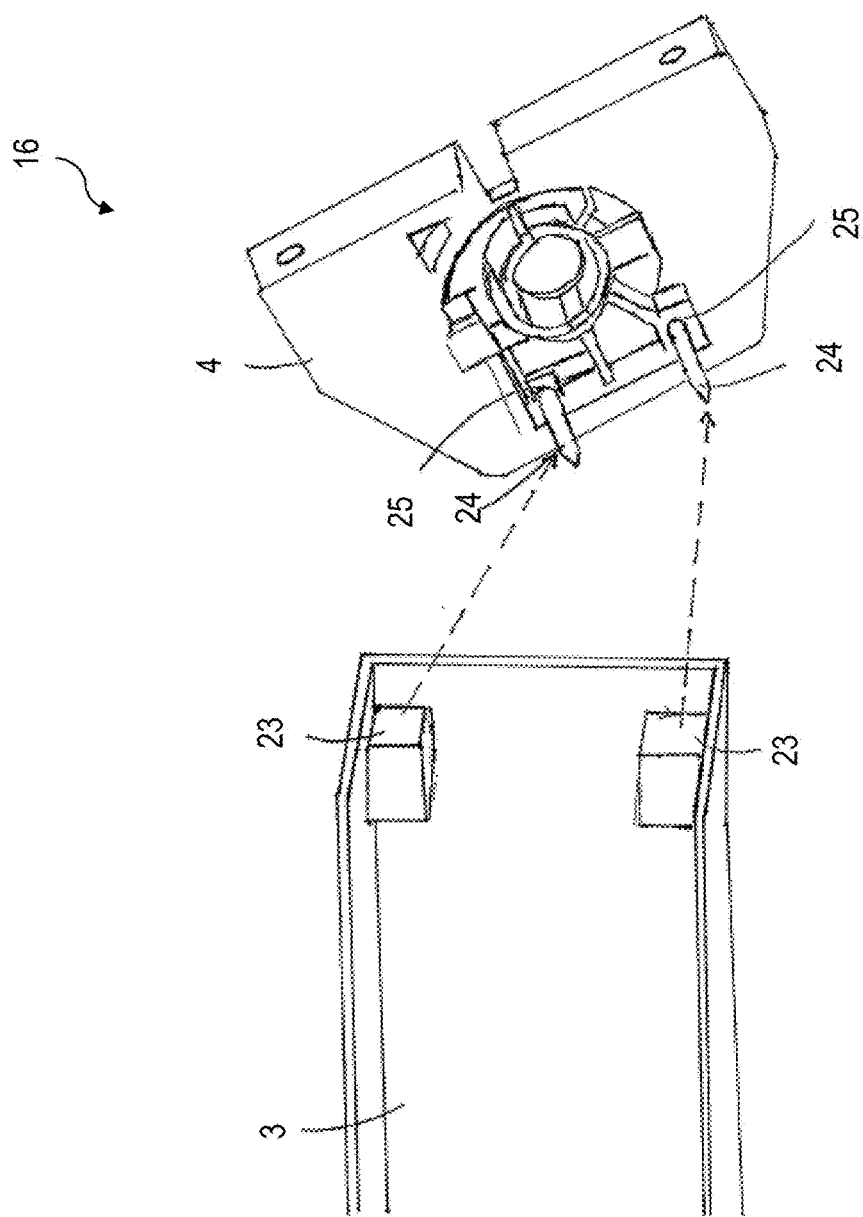
FIG. 9 is an enlarged view of the dis-assembled rigid arm and holder of the linear actuator of FIG. 1.

FIG. 9 is a close up view of a disassembled rigid arm 3 and holder 4. The rigid arm 3 incorporates one or more fastener receiving channels 23. One or more fasteners 24 pass through one or more apertures 25 in the holder 4. In this embodiment threaded screws are used as fasteners 24, but other appropriate fasteners may be used. During assembly, the holder 4 is positioned next to the rigid arm 3 so the apertures 25 in the holder 4 align with the fastener receiving channels 23 in the arm 3. The fasteners 24 are then installed, securing the holder 4 to the rigid arm 3. The use of one or more threaded screws to secure the holder 4 to the arm 3 simplifies assembly of the improved linear actuator 16 and leads to faster production.

Figure 10:
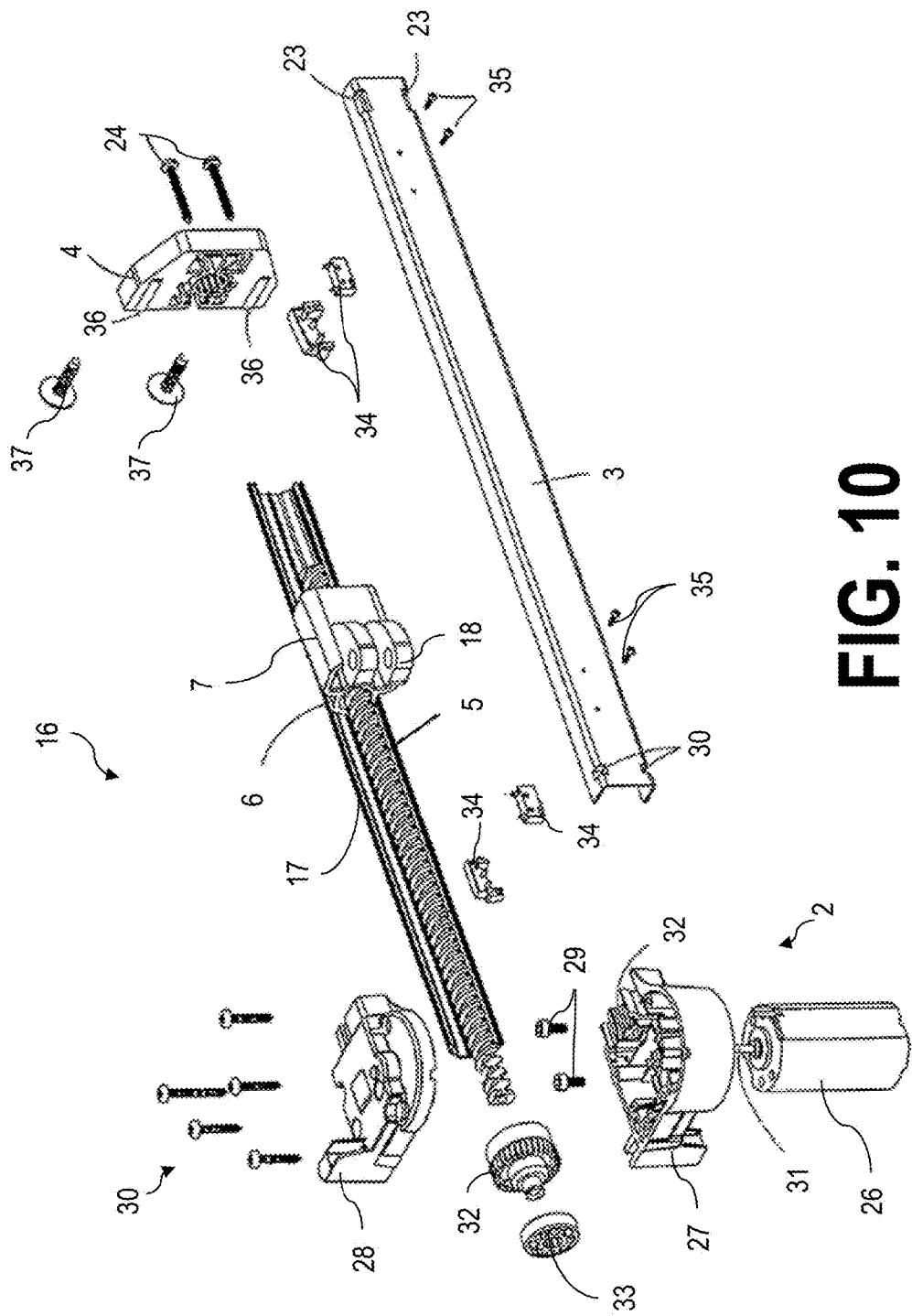
FIG. 10 is an exploded assembly view of the linear actuator of FIG. 1.

FIG. 10 is a perspective view of the disassembled improved linear actuator 16 with the pusher block 7 already positioned on the spindle 5. The electric drive motor assembly 2 is comprised of an electric motor 26, lower assembly cover 27, and upper assembly cover 28. One or more threaded screws 29 secure the electric motor 26 to the lower assembly cover 27 and a series of threaded screws 30 secures the upper assembly cover 28 to the lower assembly cover 27. A worm gear (not shown) is attached to the output shaft 31 of the electric motor 26. The worm gear turns a worm wheel 32 attached to the end of the threaded spindle 5. One end of the worm wheel 32 rests in a worm wheel bearing 33 to facilitate rotation of the spindle 5.

The spindle 5 rests within the rigid arm 3. A plastic cover 17 shields the spindle 5. The spindle nut 6 is threaded onto the spindle 5 and is attached to the pusher block 7. Switches 34 are mounted within the rigid arm 3 using threaded screws 35. The switches 34 sense the position of the pusher block 7 and are connected to the controls (not shown) and power source (not shown) for the improved linear actuator 16. When the pusher block 7 contacts a switch 34, power to the electric motor 26 is cut and travel of the pusher block 7 is stopped.

The holder 4 is attached to the end of the rigid arm 3 using threaded fasteners 24 that are screwed into fastener receiving channels 23 in the rigid arm 3. The holder 4 may incorporate apertures 36 for receiving fasteners 37 that can be used to attach the actuator 16 to mounting points on the frame of a piece of adjustable furniture.

The foregoing description of preferred embodiments for the improved linear actuator is presented for the purposes of illustration and description. They are not intended to be exhaustive or to limit the invention to the precise form disclosed. Obvious modifications or variations are possible in light of the above teachings. The embodiments are chosen and described in an effort to provide the best illustration of the principles of the invention and its practical applications, and to thereby enable one of ordinary skill in the art to utilize the invention in various embodiments and with various modifications as are suited to the particular use contemplated.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A method of assembling a linear actuator for adjustable furniture comprising:
    assembling an arm assembly of the linear actuator, wherein assembling the arm assembly comprises:
        housing a threaded spindle within a rigid arm;
        threadably engaging a spindle nut coupled to a pusher block with the threaded spindle;
        slidably engaging the pusher block with the rigid arm by inserting the rigid arm within a rigid arm passage defined by the pusher block such that the rigid arm extends through the rigid arm passage; and
        pivotally connecting a first end of a linkage within a linkage channel of an attachment projection of the pusher block, wherein the attachment projection extends outwardly from an outer surface of the pusher block; and
    connecting a drive assembly to the arm assembly, wherein the drive assembly is configured to rotate the threaded spindle within the rigid arm.

2. The method of claim 1, further comprising:
    pivotally connecting a dual angle bracket with a torque tube assembly configured to engage adjustable furniture; and
    pivotally connecting a second end of the linkage with the dual angle bracket.

3. The method of claim 1, wherein the outer surface of the pusher block comprises a top surface and at least one side surface extending downwardly from the top surface, and wherein the attachment projection extends outwardly from the top surface of the pusher block.

4. The method of claim 1, wherein the outer surface of the pusher block comprises a top surface and at least one side surface extending downwardly from the top surface, and wherein the attachment projection extends outwardly from the at least one side surface of the pusher block.

5. The method of claim 1, wherein:
    the attachment projection further defines a securing aperture extending transversely to the linkage channel and in communication with the linkage channel;
    the securing aperture extends along a securing aperture axis;
    the threaded spindle extends along a threaded spindle axis; and
    the securing aperture axis is vertically offset from the threaded spindle axis.

6. The method of claim 5, further comprising removably positioning a fastener within the securing aperture such that the fastener is engaged with the first end of the linkage positioned within the linkage channel.

7. The method of claim 6, wherein the fastener is a clevis pin.

8. The method of claim 5, wherein the securing aperture axis is above the threaded spindle axis.

9. The method of claim 1, further comprising:
    positioning a first switch within the rigid arm and between a first end and a second end of the rigid arm; and
    positioning a second switch within the rigid arm and between the first switch and the second end such that the pusher block is movable between the first switch and the second switch,
    wherein the first switch and the second switch are communicatively coupled to the drive assembly,
    wherein the first switch and the second switch are configured to sense a position of the pusher block, and
    wherein the first switch and the second switch are configured to disrupt a power source of the drive assembly if the pusher block contacts the first switch or the second switch such that rotation of the spindle is stopped to stop movement of the pusher block along the threaded spindle.

10. The method of claim 1, further comprising attaching a holder to an end of the rigid arm.

11. The method of claim 10, wherein the end of the rigid arm comprises a plurality of fastener receiving channels, wherein the holder comprises a plurality of apertures, and wherein attaching the holder to the end of the rigid arm comprises:
    aligning the plurality of fastener receiving channels with the plurality of apertures; and
    inserting fasteners through each of the aligned fastener receiving channels and apertures.

12. The method of claim 1, further comprising attaching a cover to the rigid arm such that the threaded spindle is between the rigid arm and the cover.

13. The method of claim 1, wherein connecting a drive assembly to the arm assembly comprises engaging a plurality of slots at an end of the rigid arm with a plurality of prongs on a base of the drive assembly such that the drive assembly and rigid arm are retained together.

14. The method of claim 1, wherein connecting a drive assembly to the arm assembly comprises engaging a plurality of prongs at an end of the rigid arm with a plurality of slots on a base of the drive assembly such that the drive assembly and rigid arm are retained together.

15. An arm assembly for a linear actuator for adjustable furniture comprising:
    a rigid arm;
    a threaded spindle housed within the rigid arm;
    a spindle nut threadably engaged with the threaded spindle; and
    a pusher block coupled with the spindle nut and comprising:
        a rigid arm passage, wherein the rigid arm extends through the rigid arm passage such that the pusher block is slidable along the rigid arm; and
        an attachment projection integrally formed with the pusher block and extending outwardly from an outer surface of the pusher block and defining a linkage channel,
    wherein the attachment projection is configured to receive an end of a linkage within the linkage channel and pivotally connect the linkage to the pusher block in the linkage channel of the attachment projection.

16. The arm assembly of claim 15, wherein the outer surface of the pusher block comprises a top surface and at least one side surface extending downwardly from the top surface, and wherein the attachment projection extends outwardly from the top surface of the pusher block.

17. The arm assembly of claim 15, wherein the outer surface of the pusher block comprises a top surface and at least one side surface extending downwardly from the top surface, and wherein the attachment projection extends outwardly from the at least one side surface of the pusher block.

18. The arm assembly of claim 15, wherein:
the attachment projection further defines a securing aperture extending transversely to the linkage channel and in communication with the linkage channel;
the securing aperture extends along a securing aperture axis;
the threaded spindle extends along a threaded spindle axis;
the securing aperture axis is vertically offset from the threaded spindle axis; and
the arm assembly further comprises:
a fastener removably positioned within the securing aperture,
wherein the fastener is configured to engage with the end of the linkage within the linkage channel.

19. The arm assembly of claim 18, wherein the securing aperture axis extends transversely to the threaded spindle axis, and wherein the securing aperture axis is above the threaded spindle axis.

20. The arm assembly of claim 18, wherein the fastener is a clevis pin.

* * * * *

UNITED STATES PATENT AND TRADEMARK OFFICE
CERTIFICATE OF CORRECTION

PATENT NO. : 10,066,717 B2  
APPLICATION NO. : 15/639307  
DATED : September 4, 2018  
INVENTOR(S) : Martin Kristen Page 1 of 1

It is certified that error appears in the above-identified patent and that said Letters Patent is hereby corrected as shown below:

On the Title Page

Item No. (63):
Please delete "Continuation of application No. 14/445,432, filed on Jul. 29, 2014, now Pat. No. 9,732,832."

And replace with:
-- Continuation-in-part of application No. 14/445,432, filed on Jul. 29, 2014, now Pat. No. 9,732,832, and continuation of application No. 14/445,399, filed on Jul. 29, 2014, now abandoned. --

In the Specification

Column 1, Lines 6-12:
Please delete "This application is a continuation of U.S. patent application Ser. No. 14/445,432, filed on Jul. 29, 2014 and entitled LINEAR ACTUATOR, which claims the benefit of U.S. Provisional Application No. 61/862,409, filed Aug. 5, 2013 and entitled IMPROVED LINEAR ACTUATOR, both of which are hereby incorporated by this reference in their entireties."

And replace with:
-- This application is a continuation-in-part of U.S. patent application Ser. No. 14/445,432, filed on Jul. 29, 2014 and entitled LINEAR ACTUATOR, which claims the benefit of U.S. Provisional Application No. 61/862,409, filed Aug. 5, 2013 and entitled IMPROVED LINEAR ACTUATOR, both of which are hereby incorporated by this reference in their entireties, and is also a continuation of U.S. patent application Ser. No. 14/445,399, filed on Jul. 29, 2014 and entitled LINEAR ACTUATOR, now abandoned, which also claims the benefit of U.S. Provisional Application No. 61/862,409, filed Aug. 5, 2013 and entitled IMPROVED LINEAR ACTUATOR. --

Signed and Sealed this  
Twenty-second Day of October, 2019

Andrei Iancu  
*Director of the United States Patent and Trademark Office*

Disclaimer

10,066,717 82 - Martin Kristen, Wetter. GERMANY. LINEAR ACTUATOR. Patent dated September 04, 2018. Disclaimer filed March 04, 2020 by Martin Kristen.

I hereby disclaim the claim 9 of said patent.

*(Official Gazette, July 13, 2021)*